Feb. 22, 1949.   W. C. HESS   2,462,189
VALVE FOR WINDSHIELD CLEANERS
Filed May 25, 1944

INVENTOR
WILLIS C. HESS
BY
Bean, Brooks, Buckley & Bean, ATTORNEYS

Patented Feb. 22, 1949

2,462,189

UNITED STATES PATENT OFFICE 2,462,189

VALVE FOR WINDSHIELD CLEANERS

Willis C. Hess, Buffalo, N. Y., assignor to Trico Products Corporation, Buffalo, N. Y.

Application May 25, 1944, Serial No. 537,266

3 Claims. (Cl. 251—119)

1

This invention relates to the valve art and more particularly to a check valve.

The construction of check valves frequently employed, outside of the ball valve which has a line contact with its seat, comprises a stemmed valve body in which the stem is slidably fitted in a spider or other guiding frame which entails accurately machined fittings to avoid the valve sticking or improperly seating.

The object of the present invention is to provide a check valve of simple and economical construction and is practical and efficient in use. The invention further has for its object to provide a check valve with an improved mounting which affords the valve certain freedom of movement as it moves to and from its seat for greater efficiency.

In the drawing illustrating one embodiment of the present invention,

Figure 1:
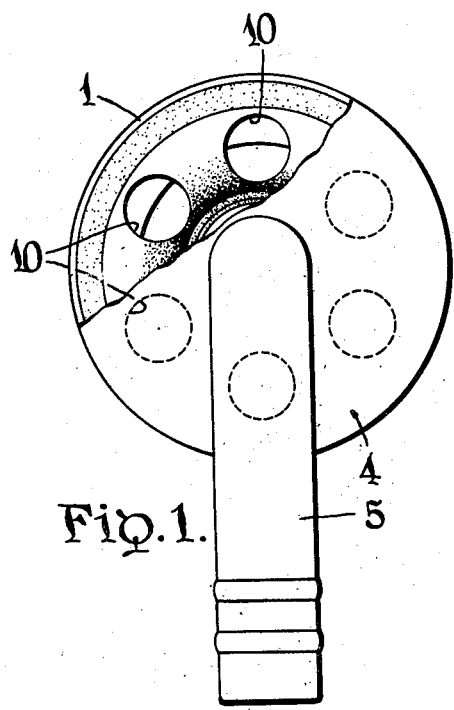
Fig. 1 is a plan view of the check valve with a portion of the valve casing broken away to more clearly illustrate the flexibly supported valving element.
Figure 2:
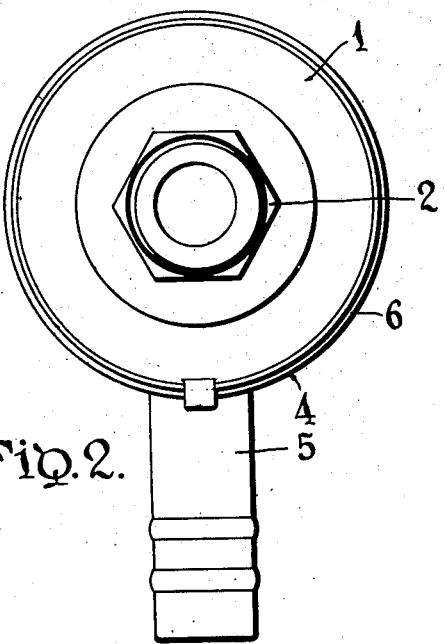
Fig. 2 is a bottom plan view of the valve assembly.
Figure 3:
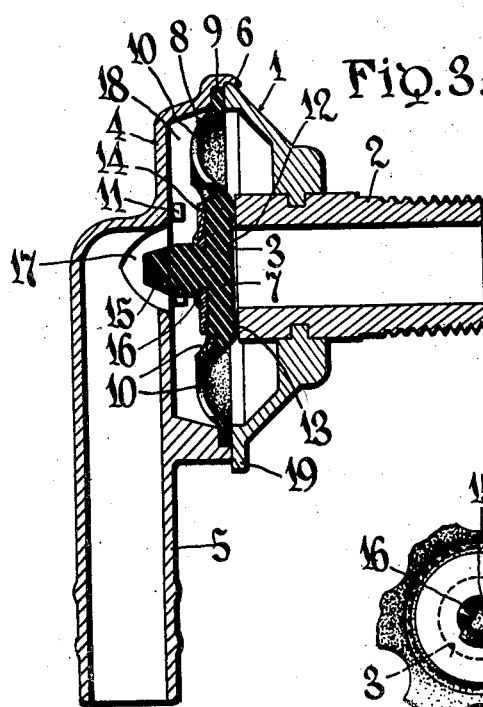
Fig. 3 is a vertical sectional view through the valve.
Figure 4:
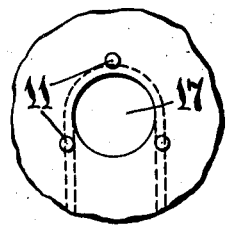
Fig. 4 is a fragmentary inside view of a part of the valve casing.
Figure 5:
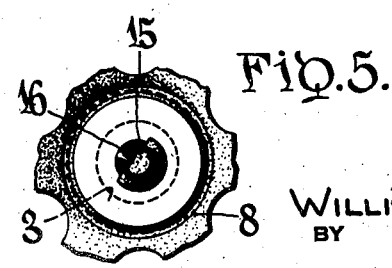
Fig. 5 is a detailed view of the valve itself.

Referring more particularly to the drawing, the numeral 1 designates the base section of the housing or casing which may be die cast about a threaded mounting nipple 2, the inner end of which later is shown extended to form a valve seat 3. The top or cap section 4 of the valve casing may be provided with an angularly directed nipple 5 for the attachment of a rubber hose or other conduit, the two casing sections 1 and 4 being fitted, one within the other, and the overhanging margin of one peened over the companion section as indicated at 6.

The valve member per se comprises a body 7 and an encircling web 8 having an anchoring marginal rim 9 embraced by the united margins of the casing sections 1 and 4. The web may be arched to increase the flexibility of the support, the entire valving member being preferably molded from rubber or like resilient material. An annular series of openings 10 in provided in the web for fluid passage when the valve body is unseated, the limit of opening movement of the valve being determined not only by the web 8 but also by inwardly extending projections 11

2 formed on the cap section 4. These may be formed at the time of die casting the upper part. If desired, the bottom face of the valve body proper may be recessed as at 12 for conserving on the material as well as for providing a rim 13 for engagement on the seat 3.

While the invention has widespread use, it is particularly useful in the accessory systems of motor vehicles and in other systems where the operating pressure is light. In the windshield cleaner system which is operated off the intake manifold of the internal combustion engine, a storage tank is inserted to conserve the low pressure for intervals when the manifold suction is nil. The present valve will be mounted on the tank by the threaded nipple 2 while the nipple 5 is connected to the intake manifold or other source of pressure. At times when the source is deficient the valve will be held firmly to its seat by the pressure differential from without the tank, and when the intake manifold becomes dominant the valve body 7 will lift from its seat to permit the withdrawal of fluid through the nipple 2.

A stiff disc 14 of metal, plastic, or the like, may be secured to the upper side of the valve body to resist the latter caving in at the center under a constantly higher pressure operating from above or without, such as when the valve engine is at rest. While this reinforcing disc may be anchored in any suitable manner, it is secured herein by an axial stem 15 formed integrally with the valve body and adapted to be drawn under tension through a relatively smaller aperture 16 in the disc with the result that when the tension is relieved the stem will expand and firmly secure the disc in place. The stem 15 may be of sufficient length to project into the outlet port 17 leading from the valve chamber 18 into the nipple 5 and thereby serve as a means for restricting lateral play of the valve upon its seat as determined by the clearance about the stem. A lug 19 may be provided on one section to engage in a recess in the companion section to hold the sections against relative rotation.

From the foregoing it will be noted that the valve is secured in place at the time of uniting the two casing sections and therefore the steps of manufacture are reduced to a minimum. The valve proper which is located at the center of the diaphragm-like supporting web is free to move in an otherwise unguided manner to and from its seat in accordance with the air or fluid flow therethrough, and that by reason of the flexible support for the valve the latter is given a certain freedom of movement sidewise on the seat tending to maintain proper seating engagement and also to wipe the seat clean and free of any accumulating particles. The valve may be economically produced and is efficient in use, the only moving element being anchored by the casing sections. Furthermore, the valve is quiet in operation, and while the foregoing description has been given in detail, it is obvious that the inventive principles involved are capable of assuming other physical embodiments without departing from the spirit of the invention as set forth in the appended claims.

What is claimed is:

1. A valve comprising complemental casing sections, one of said sections having a seat, a one-piece molded rubbery body having a valve engageable with the seat and a relatively thin encircling web with a margin clampingly embraced by the sections, said valve being molded with a stem on its back, and a backing disc having a central opening through which the stem is stretched to anchor the disc under tension, the web being arched up about the disc and supporting the valve substantially in the plane of the margin.

2. A valve comprising complemental casing sections, one of said sections having a seat, a one-piece molded rubbery body having valve engageable with the seat and a supporting arched web with a marginal portion clampingly embraced by the sections, the valve also having a stem molded on its back, a backing member for the valve through which the stem projects for play engagement with the other section to limit lateral movement of the valve on its seat, and means on said other section engageable by the backing member in limiting the unseating movement of the valve.

3. An article of manufacture comprising a one-piece molded rubbery body having a central valving disc supported by an encircling and relatively thinner web with a margin adapted to be clamped between sections of a housing, the relatively thin web being permanently arched to suspend the valving disc substantially in the plane of the margin for lateral play on an associated seat and perforated for fluid passage therethrough, said valving disc having a stem molded on its back, and a backing plate through which the stem extends for securing the plate in position on the valving disc within the perforated and arched web.

WILLIS C. HESS.

REFERENCES CITED

The following references are of record in the file of this patent:

UNITED STATES PATENTS

| Number | Name | Date |
|---|---|---|
| 171,514 | Hyde | Dec. 28, 1875 |
| 259,682 | Gruber | June 20, 1882 |
| 1,004,654 | Johnson | Oct. 3, 1911 |
| 1,786,844 | Hesselman | Dec. 30, 1930 |
| 2,018,130 | Jauch | Oct. 22, 1935 |
| 2,121,549 | McNeal | June 21, 1938 |
| 2,211,212 | Langdon | Aug. 13, 1940 |
| 2,291,603 | Barker | Aug. 4, 1942 |
| 2,346,223 | Lyon | Apr. 11, 1944 |

FOREIGN PATENTS

| Number | Country | Date |
|---|---|---|
| 158,241 | Austria | Mar. 26, 1940 |